United States Patent [19]

Inomata et al.

[11] 4,353,066

[45] Oct. 5, 1982

[54] CHANNEL SWITCHING NETWORK

[75] Inventors: Tetsuro Inomata, Kawasaki; Kazutada Katsukura, Tachikawa; Hikaru Takematsu, Higashikurume, all of Japan

[73] Assignee: Iwasaki Tsushinki Kabushiki Kaisha, Japan

[21] Appl. No.: 210,317

[22] Filed: Nov. 25, 1980

[30] Foreign Application Priority Data

Nov. 29, 1979 [JP] Japan .................................. 54-154660

[51] Int. Cl.³ .............................................. H04Q 3/52
[52] U.S. Cl. ............................. 340/825.96; 179/18 GF
[58] Field of Search ...................... 340/166 R, 825.96; 179/18 GF

[56] References Cited

U.S. PATENT DOCUMENTS 3,688,051 8/1972 Aagard ........................... 179/18 GF
3,694,812 9/1972 Enomoto ........................ 179/18 GF
4,025,726 5/1977 Matsuyama ..................... 179/18 GF Primary Examiner—Harold I. Pitts
Attorney, Agent, or Firm—Robert E. Burns; Emmanuel J. Lobato; Bruce L. Adams

[57] ABSTRACT

A channel switching network, in which each cross-point of a switch matrix is constituted as a channel switch of balanced type using two PNPN semiconductor elements. Each of the two PNPN semiconductor elements is arranged in a forward direction with respect to a direct current flowing from the channel switching network to a corresponding terminal equipment. A column of cross-points and a line of cross-points in the switch matrix are designated to select a simultaneously designated cross-point in response to a pair of selection signals. A control circuit is provided for each pair of the incoming lines and the outgoing lines of the switch matrix so that the terminal voltage of a power source for flowing the direct current in the PNPN elements is controlled to temporarily rise to turn ON the PNPN elements at the selected cross-point and thereafter to drop to such a value as only to maintain the PNPN elements in the ON states.

3 Claims, 4 Drawing Figures

CHANNEL SWITCHING NETWORK

BACKGROUND OF THE INVENTION

1. Field of the Invention

The present invention relates to a channel switching network of balanced type employing PNPN semiconductor elements.

2. Description of the Prior Art

For the selection of a particular cross-point switch in a switch matrix which is the balanced typed channel switching network formed by PNPN elements, there has been required an AND circuit for each cross-point switch. This inevitably increases the number of parts used, and hence is disadvantageous in terms of the packing space, power consumption and the cost.

SUMMARY OF THE INVENTION

An object of the present invention is to provide an economical and small-sized channel switching network in which two PNPN elements at each of cross points forming a switching network of balanced type are equipped with the AND function, thereby permitting to omit the provision of an AND circuit at each cross point in addition to the two PNPN elements.

BRIEF DESCRIPTION OF THE DRAWINGS

The principle, construction and operation of this invention will be clearly understood from the following detailed description taken in conjunction with the accompanying drawings, in which.

DETAILED DESCRIPTION

Figure 1:
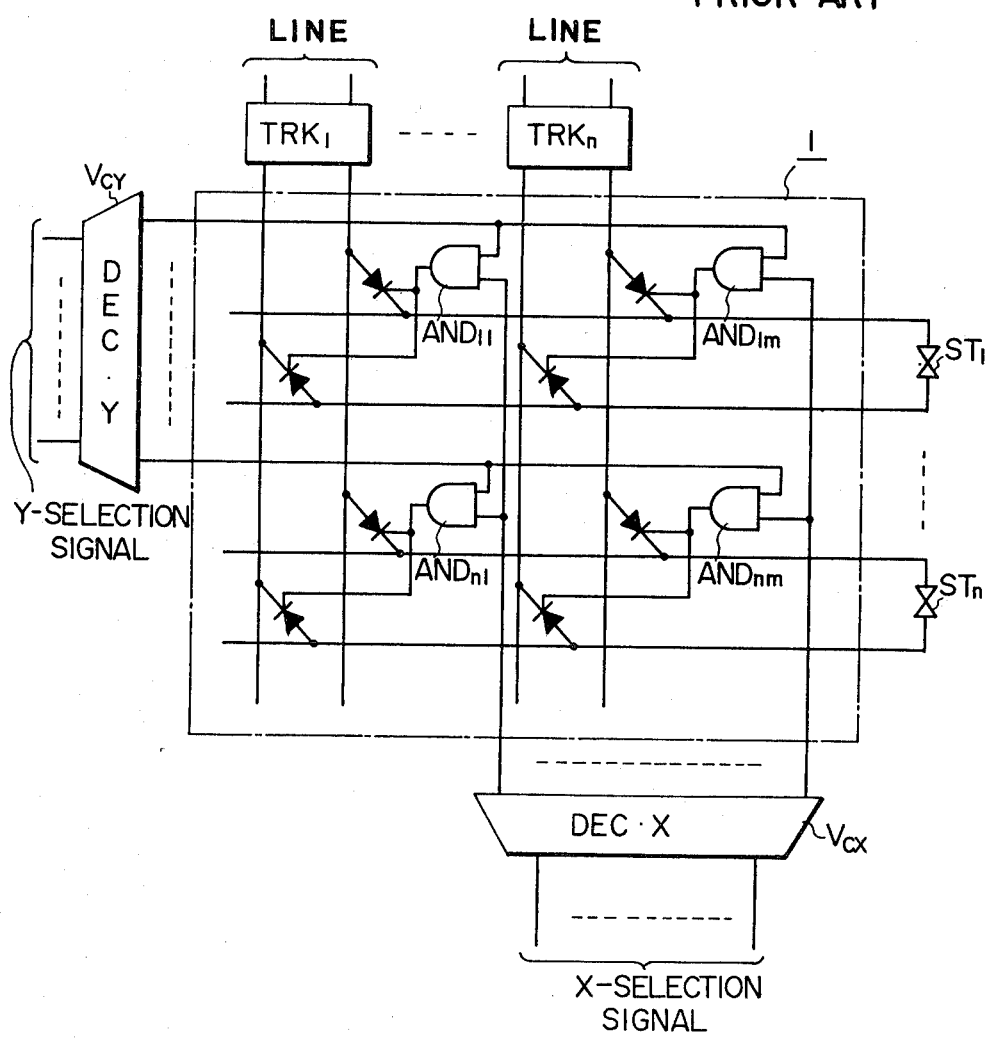
FIG. 1 is a circuit connection diagram illustrating an example of prior art.

For the selection of a particular cross-point switch in a conventional switch matrix, there has been required an AND circuit $AND_{11}, \ldots AND_{lm}, \ldots AND_{nl}, \ldots$ or $AND_{nm}$ for each cross-point switch as shown in FIG. 1 so as to result in the above-mentioned disadvantages.

A detailed description will be given of the present invention.

Figure 2:
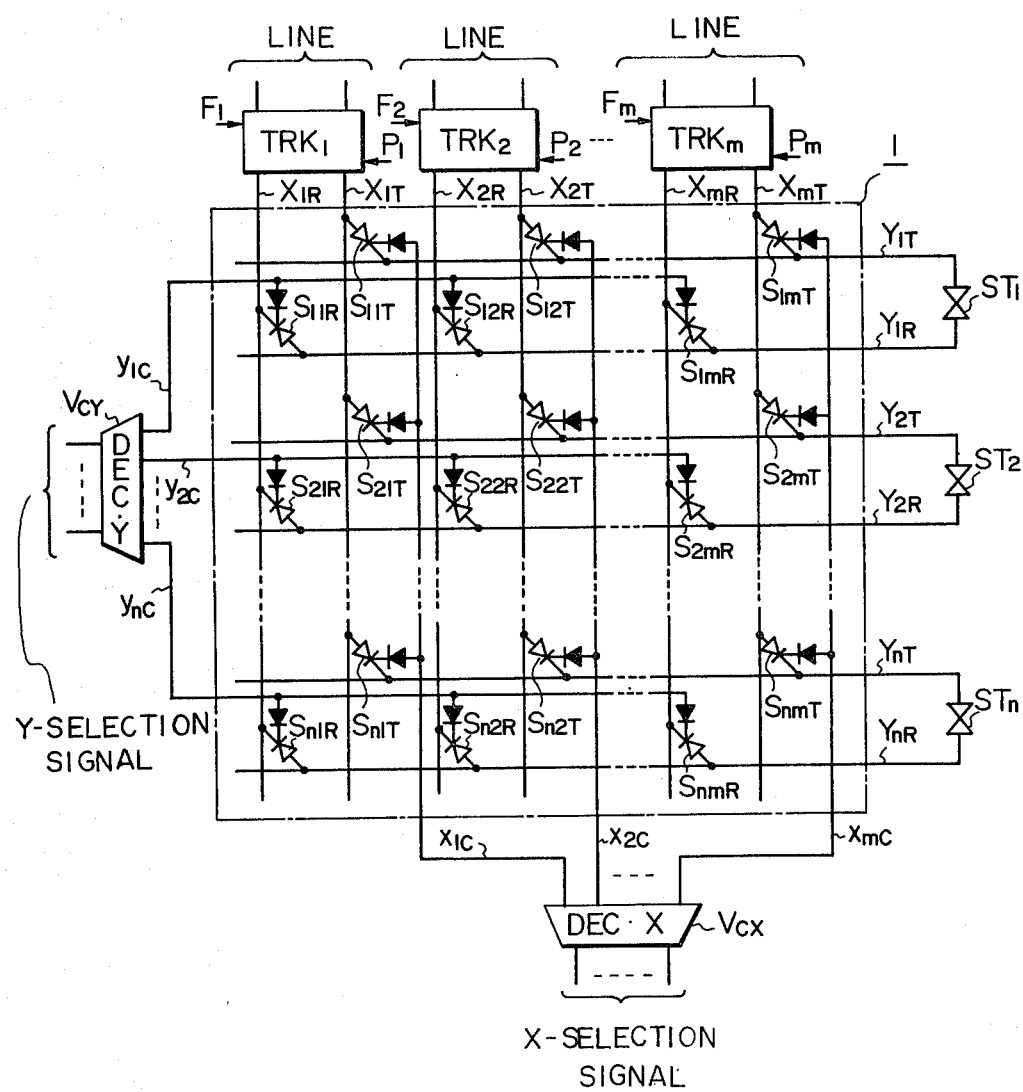
FIG. 2 is a circuit connection diagram showing an embodiment of the present invention.

In FIG. 2 illustrating an embodiment of the present invention, reference characters $TRK_1$, $TRK_2 \ldots TRK_m$ indicate trunks No. 1, No. 2 ... No. m, each connected to the CO line; and $ST_1$, $ST_2 \ldots ST_n$ designate telephone sets No. 1, No. 2, ... No. n, each serving as a terminal equipment. The trunks and the telephone sets are interconnected via a cross-point switch matrix 1 constituted by cross-point switches $S_{11T}$, $S_{11R}$, $S_{21T}$, $S_{21R}$, .... Each cross-point is formed by two PNPN elements $S_{nmT}$ and $S_{nmR}$, which are connected in a forward direction with respect to a direct current flowing to each terminal equipment. Further, a pair of selection control signals for tuning ON and OFF a selected cross-point switch are applied to the cross-point switch matrix 1 as $x_{1c}, x_{2c}, \ldots x_{mc}$ and $y_{1c}, y_{2c}, \ldots y_{2c}$ after decoded by decoders DEC.X and DEC.Y in the Y- and X-directions, respectively.

Figure 3:
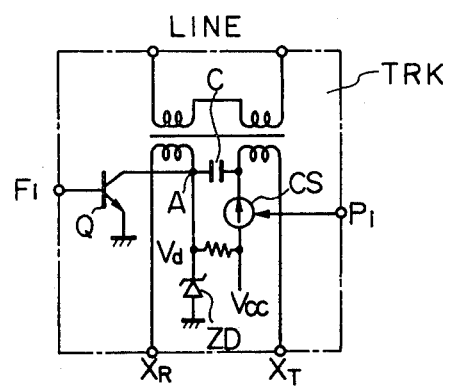
FIG. 3 is a circuit diagram illustrating an example of a trunk circuit used as a power source in the present invention.

In such an arrangement, a so-called speech current is supplied from a trunk circuit, an example of which is shown in FIG. 3. In FIG. 3, reference character $P_i$ indicates an ON-OFF signal (first control signal) for a current source CS; $F_i$ designates an ON-control signal (second control signal) for a switching transistor Q; ZD denotes a Zener diode for clamping the collector potential of the switching transistor Q at a certain voltage $V_d$; and C represents a capacitor for a path of an AC signal.

Figure 4:
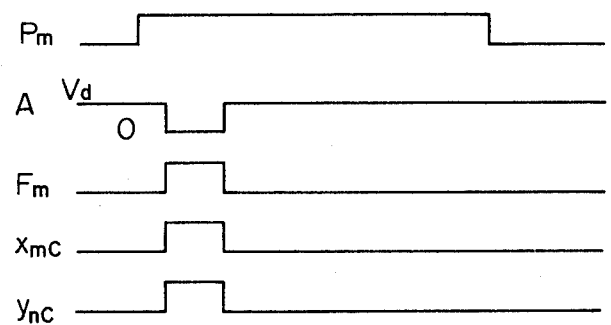
FIG. 4 is a current diagram explanatory of the operation of the present invention.

A description will be given, with reference to FIG. 4, of the operation of the above arrangement in a case where the trunk $TRK_m$ and the telephone set $ST_n$ are interconnected or disconnected from each other.

(1) In case of connection:

In this case, the cross-point switches $S_{nmT}$ and $S_{nmR}$ are to be turned ON. At first, X-direction and Y-direction select signals $x_{mc}$ and $y_{nc}$ are simultaneously applied in the form of pulses to the cross-point switch matrix 1. At the same time, the control current $P_m$ also assumes the ON-state. At this time, the cross-point switches $S_{1mT}, S_{2mT}, \ldots$ are triggered by the X-direction signal $x_{mc}$, but since the Y-direction signal is only $y_{nc}$, the cross-point switches $S_{1mR}, S_{2mR}, \ldots$ are not triggered. Accordingly, the direct current path essential for holding the PNPN element at the ON state is extended to a route, for example, $X_{mT} \rightarrow S_{1mT} \rightarrow ST_1$, but the route is cut off at the cross-point switch $S_{1mR}$. This means that the cross-point switches $S_{1mT}$ and $S_{2mT}$ are turned OFF immediately after being turned ON. After all, only the cross-point switches $S_{nmT}$ and $S_{nmR}$ are turned ON by the select signals $x_{mc}$ and $y_{nc}$.

(2) In case of disconnection:

By turning OFF the signal $P_m$ which is the ON state while the telephone set $ST_n$ is connected to the trunk $TRK_m$, no current flows in a drive line $X_{mT}$, turning OFF the cross-point switch $S_{nmT}$ held in the ON state. Upon turning OFF of the cross-point switch $S_{nmT}$, the direct current to the cross-point switch $S_{nmR}$ is also terminated, turning it OFF. Thus, the trunk $TRK_m$ and the telephone set $ST_n$ are disconnected from each other.

As described above, according to the present invention, it is possible to select one cross-point switch (that is, two PNPN elements), omitting the AND circuit used in FIG. 1. However, the abovesaid arrangement, as it is, has the following defect. Namely, when selected by select signals, the switch selected is once turned ON but thereafter turned OFF since no current route exists. Let it be assumed that signals $x_{2c}$, $Y_{2c}$ and $P_2$ assume ON-states for interconnecting the trunk $TRK_2$ and the telephone set $ST_2$ in the state in which the cross-point switches $S_{nmT}$ and $S_{nmR}$ are in the ON state. Upon turning ON of the above three signals, the cross-point switches $S_{22T}$ and $S_{22R}$ are turned ON, as described previously, but one of the switches triggered by the signal $x_{2c}$ is a cross-point switch $S_{n2T}$. A cross-point switch $S_{n2R}$ corresponding to the cross-point switch $S_{n2T}$ is not triggered, but since the switch $S_{nmR}$ is in the ON state, there exists a route $[X_{2T} \rightarrow S_{n2T} \rightarrow ST_n \rightarrow S_{nmR} \rightarrow X_{mR}]$, resulting in the turning ON of the cross-point switch $S_{n2T}$ to be held at the OFF state so that an extra unnecessary connection made in an unbalanced form. This is a serious drawback.

It is the control signal $F_i$, the transistor Q and the Zener diode ZD in FIG. 3 that overcomes this defect. Generally, in the case of turning ON a PNPN element by applying a trigger signal to its gate, the cathode potential with respect to the trigger signal is important, and the trigger signal must be higher than the cathode potential. In addition, once the element is turned ON, only a direct current is needed for holding it in the ON state. Then, as shown in FIG. 4, when the control signal $P_m$ of the current source SC is switch ON to output the select signals $x_{mc}$ and $y_{nc}$, a control signal $F_m$ is also applied to the trunk. Assume that the signal $F_m$ is the ON state for the same time as the select signals are provided. By this, the potential at a point A in FIG. 3 is held 0 by the conduction of the transistor Q while the selected signals are produced and, in the reminder, it is held at a lower potential $V_d$ determined by the Zener diode ZD. Accordingly, the aforesaid defect is settled in the following manner: Namely, even when the cross-point switches $S_{nmT}$ and $S_{nmR}$ are at the ON state, the drive line $X_{mR}$ is held at the potential $V_d$; consequently, even if the signal $x_{2c}$ is provided, the cross-point switch $S_{n2T}$ is not turned ON since the cathode of the cross-point switch $S_{nmR}$ is maintained at the potential $V_d$.

As described above, according to the present invention, in a channel switching network in which each cross-point of a switch matrix is constituted as a channel switch of balanced type, using two PNPN semiconductor elements, each of these PNPN elements are arranged in a forward direction with respect to a direct current flowing the channel switching network to a corresponding terminal equipment, and a control circuit is provided so that the terminal voltage of a power source for flowing the abovesaid direct current to the PNPN elements is controlled for each selected pair of the incoming line and the outgoing line of the switch matrix to temporarily rise to turn ON the PNPN elements and thereafter drops to such a value as only to hold the PNPN elements in the ON state.

As has been described in the foregoing, according to the present invention, AND circuits need not be provided and the balanced cross-point switch network itself has the AND function; accordingly, the channel switching network of the present invention is economical and small in size. While in the foregoing the current source is provided at the trunk, the current source may also be placed at the telephone set. Further, it is also possible to provide a transformer at the telephone set.

What we claim is:

1. A channel switch network comprising:
   a plurality of cross-point switches arranged in a switch matrix, each cross-point of which is constituted as a channel switch of balanced type having two PNPN semiconductor elements, each of the two PNPN semiconductor elements being arranged in a forward direction with respect to a direct current flowing from the channel switching network to a corresponding terminal equipment connected to said switch matrix;
   selection means for designating in response to a pair of selection signals a column of cross-point switches and a line of cross-point switches in the switch matrix to select a simultaneously designated cross-point switch;
   power source terminal means for receiving a direct current from a power source; and
   control means provided for each pair of the incoming lines and the outgoing lines of the switch matrix to flow the direct current in the PNPN semiconductor elements at a cross-point of the switch matrix selected by said selection means so that the terminal voltage thereof for flowing the direct current in the selected PNPN semiconductor elements from said power source terminal means is controlled to temporarily rise to turn ON the selected PNPN semiconductor elements and thereafter to drop to a value as to only maintain the selected PNPN semiconductor elements in the ON states.

2. A channel switch network according to claim 1, in which said selection means comprises a plurality of line conductors, provided to designate each one of said PNPN semiconductor elements at all cross-points on a line of the switch matrix to be selected, and a plurality of column conductors, provided to designate each the other of said PNPN semiconductor elements at all cross-points on a column of the switch matrix to be selected.

3. A channel switch network according to claim 1, in which said control means comprises a pair of output terminals for providing said terminal voltage, a first control signal terminal for receiving a first control signal, a second control signal terminal for receiving a second control signal, a current source inserted in a path from one of the terminals of said power source terminal means to one of said pair of output terminal means and controlled to be turned ON in response to said first control signal, and clamping means for clamping the voltage of the other of said pair of output terminals to drop the terminal voltage across said pair of output terminals except when the second control signal is applied at the same time as the designation of said selected cross-point switch.

* * * * *